United States Patent [19]
Schellenberg et al.

[11] Patent Number: 5,507,515
[45] Date of Patent: Apr. 16, 1996

[54] UNIVERSAL TRAILER HITCH

[76] Inventors: Aaron T. Schellenberg; Albert T. Schellenberg, both of 11089 N. 5020 West, Highland, Utah 84003

[21] Appl. No.: 460,310

[22] Filed: Jun. 2, 1995

[51] Int. Cl.⁶ .................................................. B60D 1/52
[52] U.S. Cl. ......................................... 280/491.5; 280/501
[58] Field of Search ........................... 280/491.1, 491.2, 280/491.5, 495, 500, 501, 502, 497

[56] References Cited

U.S. PATENT DOCUMENTS

| | | | |
|---|---|---|---|
| 2,569,086 | 9/1951 | Zenk | 280/33.44 |
| 2,797,107 | 6/1957 | Bernard et al. | 280/501 |
| 2,809,759 | 10/1957 | Manker | 214/620 |
| 3,737,177 | 6/1973 | Gal | 280/495 |
| 3,843,165 | 10/1974 | Mathisen | 280/495 |
| 3,885,817 | 5/1975 | Christian | 280/495 X |
| 4,032,170 | 6/1977 | Wood | 280/495 |
| 4,111,449 | 9/1978 | Hancock | 280/490 |
| 4,438,945 | 3/1984 | Curtis | 280/495 X |
| 4,610,458 | 9/1986 | Garnham | 280/495 |
| 5,143,393 | 9/1992 | Meyer | 280/491 |
| 5,149,122 | 9/1992 | Helber | 280/495 |
| 5,193,837 | 4/1993 | Fink et al. | 280/495 |
| 5,277,448 | 1/1994 | Colibert | 280/495 |

FOREIGN PATENT DOCUMENTS

| 1260512 | 9/1989 | Canada | 280/500 |
|---|---|---|---|

*Primary Examiner*—Kevin T. Hurley
*Attorney, Agent, or Firm*—Workman, Nydegger & Seeley

[57] ABSTRACT

An adjustable trailer hitch device that is affixed to the undercarriage of a vehicle so as to be supported by the chassis and bumper mounting brackets thereof without modification, welding, drilling, or bolting. The hitch is adjustable as to width, height, and depth, and includes a retractable tension cord having a hook at the end thereof for hooking onto the chassis. The tension cord is tensioned by winding or reeling, and also by extending the length of a vertically oriented compression member extending fore of the vehicle from the aft section of the hitch so as to apply an increased force to the underside of the chassis of the vehicle. A pair of vertically and horizontally adjustable jaws retractably grip the port and starboard bumper mounting brackets of the vehicle which, with the hook, attach the hitch device to the chassis of the vehicle.

25 Claims, 2 Drawing Sheets

UNIVERSAL TRAILER HITCH

BACKGROUND OF THE INVENTION

1. The Field of the Invention

The present invention relates generally to trailer hitches for land vehicles, and particularly to an adjustable trailer hitch for non-permanent quick installation to and removal from land vehicles of varied dimensions, makes, and models.

2. The Relevant Technology

The prior art contains some trailer hitches that are adjustable in a limited way so as to fit different vehicles. Prior art trailer hitches normally involve a difficult and permanent installation that requires drilling, welding, or other extensive procedures. These extensive procedures build in additional time that is required to remove the hitch from the vehicle after it has been installed. Consequently, there is a need for a hitch that can be installed on the chassis or frame of the vehicle without drilling, welding, or other extensive procedures which are time consuming. Further, there is a need for such installation and removal that can be done by a person lacking mechanical skill without sacrificing safety of the installation. Finally, there is a need to provide an adjustable trailer hitch that reduces the expense of trailer hitch installation and removal by lowering the equipment and labor costs required for installation and removal.

SUMMARY AND OBJECTS OF THE INVENTION

In light of the foregoing, it is an object of the current invention to provide a universal trailer hitch that can be installed without welding, drilling, or other permanent alteration of the chassis of the vehicle.

It is another object of the present invention to provide a non-permanent trailer hitch that can be installed on a great variety of land vehicles that differ in chassis dimensions.

It is a further object of the present invention to provide a non-permanent trailer hitch that can be installed by a person without advanced mechanical skill while achieving a safe installation, and a quick removal after such installation.

The accomplishment of the foregoing objectives is achieved by a trailer hitch for attachment of a tongue of a trailer to a vehicle having a port bumper-mounting bracket, a starboard bumper-mounting bracket, and in most cases, but not all cases, a chassis beam running essentially fore and aft along the underside of the vehicle. The trailer hitch has a port gripping means for releasably gripping the port bumper-mounting bracket, and a starboard gripping means for releasably gripping the starboard bumper-mounting bracket. The trailer hitch also has a port gripping arm having a first end opposite a second end and being connected at the first end thereof to the port gripping means and extending vertically below the port bumper-mounting bracket to the second end thereof when the port gripping means grips the port bumper-mounting bracket, and has a starboard gripping arm having a first end opposite a second end and being connected at the first end thereof to the starboard gripping means and extending below the starboard bumper-mounting bracket to the second end thereof when the starboard gripping means grips the starboard bumper-mounting bracket.

There is included in the trailer hitch a hitch base having a port end opposite a starboard end, where the port end of the hitch base has attached thereat the second end of the port gripping arm and the starboard end of the hitch base has attached thereat the second end of the starboard gripping arm. A tongue bearing means for attaching the tongue of the trailer is attached to the hitch base and extends aft therefrom. A compression means is attached to the hitch base at a first end thereof and extends fore of the vehicle to an opposite second end thereof. The compression means exerts at the second end thereof a vertically upward directed force upon the chassis beam or upon another sufficiently strong location on the underside of the vehicle provided the vehicle does not include a chassis beam. The trailer hitch also has a tensioning means that is attached to the hitch base at a first end thereof and extends fore of the vehicle to an opposite second end thereof. The tensioning means serves to releasably make an attachment at the second end thereof to the chassis beam or other secure location underneath the vehicle.

The universal hitch can be adjusted in any number of different ways and can be safely installed on a variety of vehicles of different dimensions without the need for welding, drilling, or other permanent alteration, defacing, or destructive changes to any part of the vehicle.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
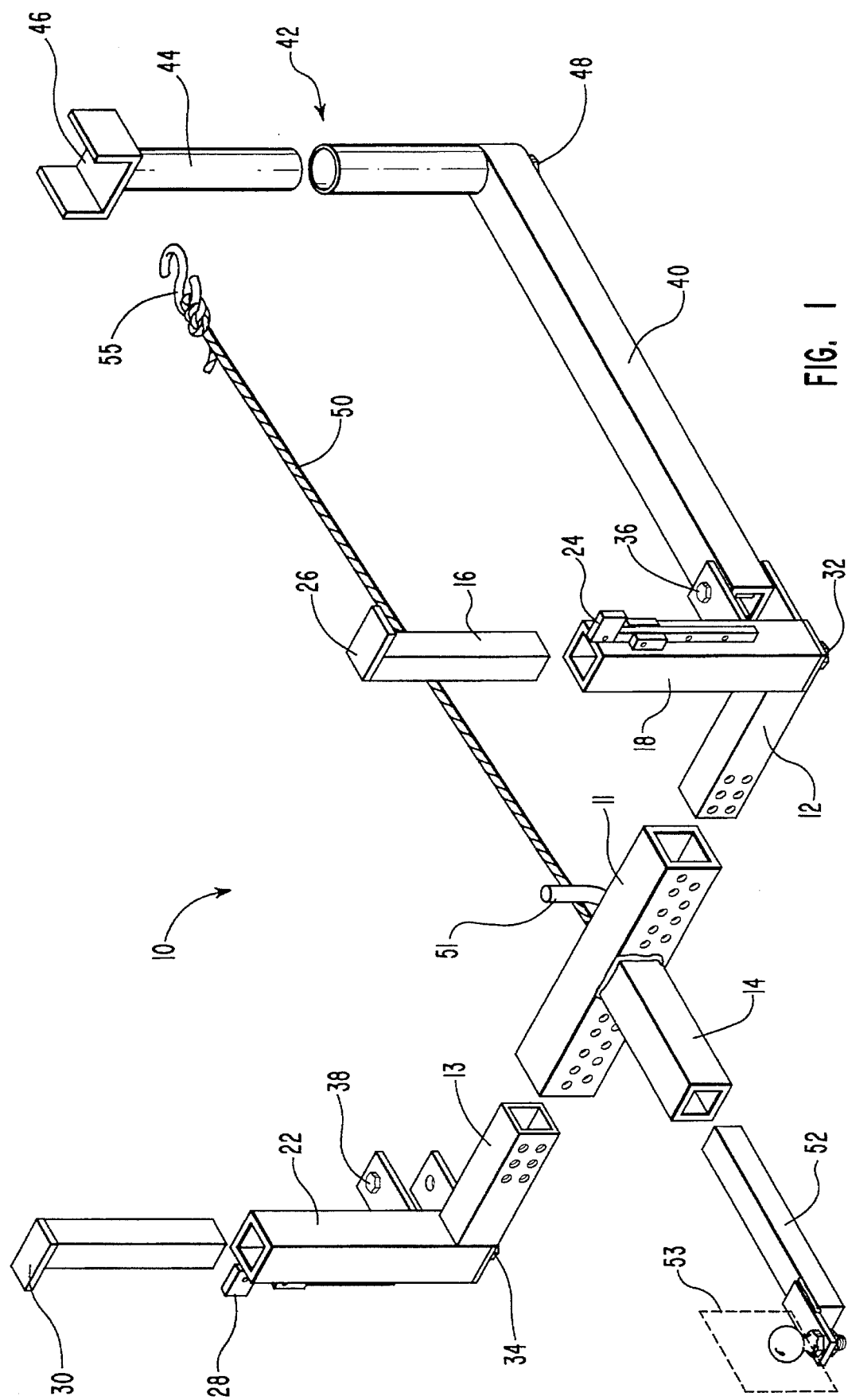
FIG. 1 is an exploded view of a preferred embodiment of the universal trailer hitch.
Figure 2:
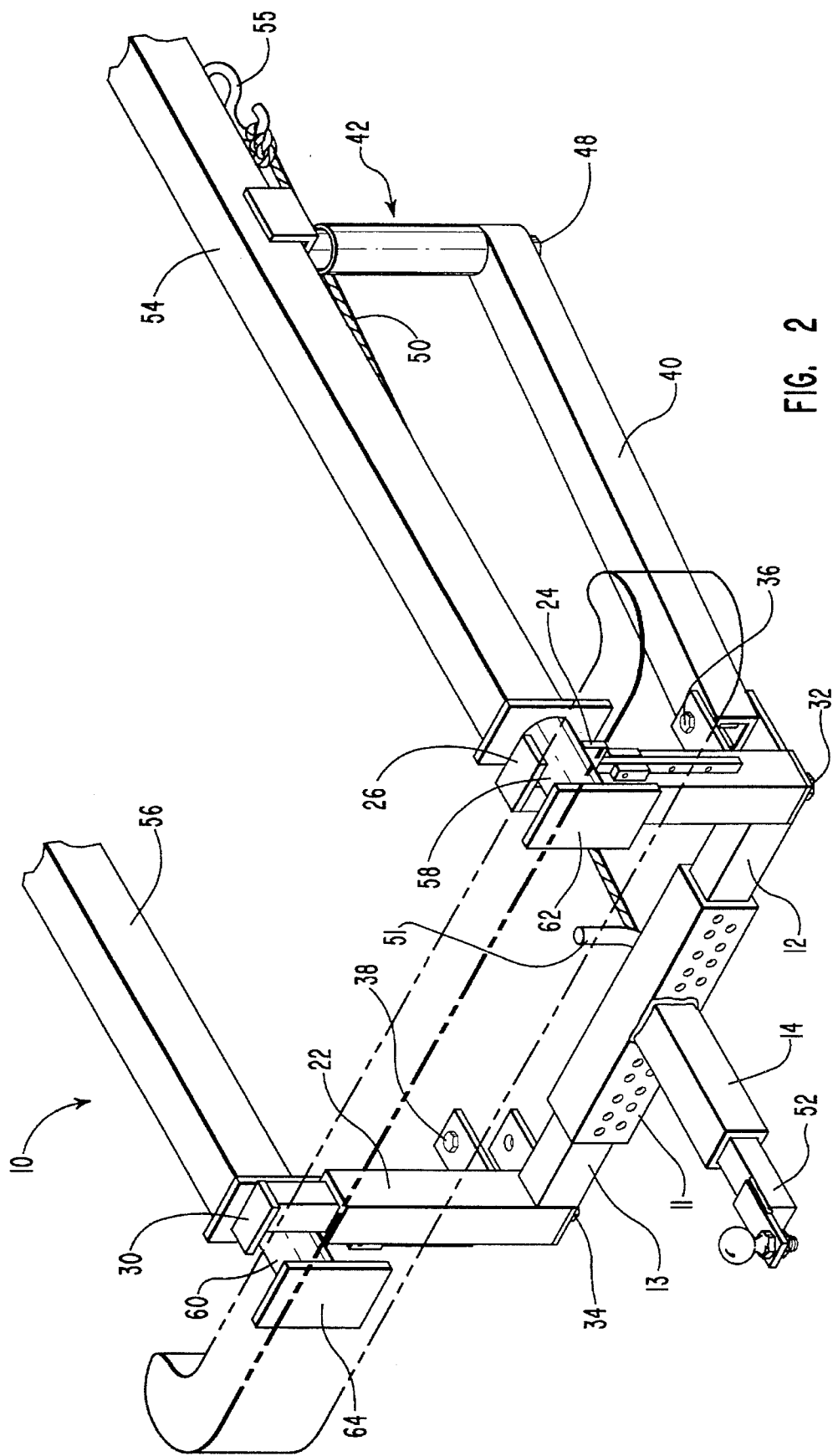
FIG. 2 is a perspective view of the universal trailer hitch shown in FIG. 1, the same being attached to the chassis of a vehicle and recessed underneath a bumper of the vehicle.

FIGS. 1 and 2 show a preferred embodiment of the inventive universal trailer hitch by a hitch 10. Hitch 10 has a hitch sheath 11 into which is slidingly receives a starboard side channel 12 and a port side channel 13. A variety of holes in hitch sheath 11 are positioned to accommodate a corresponding variety of holes, respectively, in starboard side channel 12 and port side channel 13. The corresponding holes may receive therethrough one or more bolts, rivets, hitch pins, or other affixing hardware which are seen recessed in FIG. 2, so as to prevent relative movement between hitch sheath 11 and port and starboard side channels 13, 12. A hairpin cotter may be used to maintain the hitch pin in its position through the aforesaid corresponding holes.

Hitch sheath 11, starboard side channel 12, port side channel 13, and the affixing hardware therebetween, collectively, serve as an example and an illustration of a means for adjusting the distance between the port and starboard ends of the hitch base.

Extending aft of the vehicle from hitch sheath 11 is a receiver 14. Receiver 14 receives a draw bar-ball hitch assembly 52 upon which a tongue 53 of a trailer (not shown) rests. Receiver 14 and draw bar-ball hitch assembly 52 serve as an example and illustration of a tongue bearing means, attached to a hitch base and extending aft therefrom, for attaching a tongue of a trailer.

Both port and starboard side channels 13, 12 have holes therethrough at an end thereof for fixing the position thereof relative to hitch sheath 11. At an end opposite these holes, each of the port and starboard side channel 13, 12 have a riser extending upwardly therefrom. Port side channel 13 has a port telescope sheath 22 extending upwards from an end of port side channel 13, and starboard side channel 12 has starboard telescope sheath 18 extending upwardly from an end of starboard side channel 12.

Starboard telescope sheath 18 has a starboard telescope riser 16 that is slidingly received therein and can be telescoped in the upward and downward directions adjustably by starboard telescope adjuster 32. Similarly, port telescope sheath 22 slidingly receives therein a port telescope riser 20 that is adjustably moved vertically upward and downward by port telescope adjuster 34. Port and starboard telescope adjusters 32, 34 operate via conventional means so as to slidingly telescope the channel shape of starboard and port risers 16, 20, respectively, within sheaths 18, 22. By way of example, and not by way of limitation, a screw drive mechanism actuated by revolutions of a bolt so as to turn a screw drive is a mechanism to actuate such a telescoping movement. An alternative way to effectuate the telescoping movement is a hydraulic pump using a hydraulic cylinder incorporated within the telescoping structure. Other means to effectuate such a telescoping movement are also contemplated and are within the skill of the artisan.

The purpose of adjustably telescoping starboard telescope riser 16 within starboard telescope sheath 18 and port telescope riser 20 within port telescope sheet 22 is to cause the closing of jaws located on the respective ends of such pieces. A starboard lower jaw 24 and a starboard upper jaw 26 is adjustably closed and opened by the respective movement of starboard telescope riser 16 within starboard telescope sheath 18 via starboard telescope adjuster 32. Similarly, a port upper jaw 30 is opened and closed with respect to a port lower jaw 28 with the respective movement of port telescope riser 20 within port telescope sheath 22 via port telescope adjuster 34. As can be seen from FIG. 2, starboard lower jaw 24 is closed with respect to starboard upper jaw 26 upon a starboard bumper attachment extension 58, and a port bumper attachment extension 60 has been closed upon by port lower jaw 28 and port upper jaw 30. By the closing of the jaws upon the aforesaid bumper attachment extensions 58, 60, hitch sheath 11 is held in a fixed relative position thereto.

Starboard telescope riser 16, starboard telescope sheath 18, starboard lower jaw 24, starboard upper jaw 26, and starboard telescope adjuster 32 serve as an example and illustration collectively, of a starboard gripping means for releasably gripping a starboard bumper-mounting bracket of a vehicle. Port telescope riser 20, port telescope sheath 22, port lower jaw 28, port upper jaw 30 and port telescope adjuster 34 serve as an example and illustration collectively of a port gripping means for releasably gripping a port bumper-mounting bracket.

Extending towards the front of the vehicle from starboard telescope sheath 18 and port telescope sheath 22 are, respectively, a starboard compression arm retention hinge 36 and a port compression arm retention hinge 38. Either of hinges 36, 38 may have attachably extending therefrom a compression arm 40. Compression arm 40 can swing between the port and starboard sides of the vehicle via hinges 36, 38. It is intended that only one compression arm 40 needs to be installed in either hinge 36, 38 so as to achieve a safe installation of universal hitch 10. It is contemplated, however, that a compression arm 40 may be installed in both hinge 36 and in hinge 38 simultaneously. It is also contemplated that a compression and could be installed anywhere in between the port and starboard ends of the hitch base if the need arises. Compression arm 40 is installed at an end thereof to one of hinges 36, 38. At an opposite end of compression arm 40, there is situated an extension 42 rising vertically therefrom.

Extension 42 has a riser rod 44 having a C-bracket 46 at an end thereof, which riser rod 44 is attached at an opposite end thereof to compression arm 40. A riser adjuster 48 effectuates the longitudinal extension or retraction of riser rod 44 while also causing C-bracket 46 to rotate about a longitudinal axis of riser rod 44 into a desirable position to accommodate the chassis of the vehicle. Riser adjuster 48, by conventional means, effectuates the longitudinal extension and retraction of riser rod 44, and also effectuates the rotation of C-bracket 46. By way of example, and not by way of limitation, the extension and retraction movement of riser rod 44 may be accomplished by hydraulic cylinders, worm screw arrangements, chain-and-pulley arrangements, and any other means known in the art. Riser rod 44 may be, for example a telescoping sheath and channel arrangement which enables riser rod 44 to longitudinally extend and retract as effectuated by a riser adjustment 48. C-bracket 46 rotates at and end of riser rod 44, for example, via a physical attachment to a pan contained within extension 42, which revolution is effectuated by riser adjuster 48 in a conventional manner.

Starboard compression arm retention hinge 36, port compression arm retention hinge 38, compression arm 40, extension 42, riser rod 44, C-bracket 46, and riser adjuster 48, collectively, serve as an example and an illustration of a compression means, attached to a hitch base at a first end thereof and extending fore of the vehicle to an opposite second end thereof for exerting at the second end thereof a vertically upward directed force upon a chassis beam of a vehicle.

An attachment tensioner 50, which can incorporate a flexible cable, cord, chain, or a solid rod, is secured at one end thereof to the chassis of the vehicle and is attached at an opposite end thereof preferably, to hitch sheath 11. When a flexible cable is incorporated in the attachment tensioner 50 it can be tensioned by conventional means, including a winch, turnbuckle, winding and reeling, or other take-up mechanism 51 located within, on, or proximal to hitch sheath 11, by tying knots to shorten the flexible cable of attachment tensioner 50 or by other techniques and designs known to those of ordinary skill in the art. When a solid rod is incorporated in the attachment tensioner 50, the solid rod may be threaded at an end thereof and a bolt 51 or other take-up mechanism 51 attached to hitch sheath 11 can then be threadingly moved along the threads of the solid rod to alternatively shorten or to lengthen the distance between hitch sheath 11 and a hook 55 seen in FIG. 1 and 2, whereby a tension is applied on along the length of the solid rod.

The attachment of attachment tensioner 50 to the chassis of the vehicle can be made by conventional means, including hook 55 secured at an end thereof which is inserted into a hole (not shown) predrilled by the manufacturer into the chassis of the vehicle. It is conventional for a vehicle chassis to be provided with a large number of such holes at the time of manufacture. Consequently, hook 55 or other suitable attachment hardware at an end of attachment tensioner 50 is a convenient way to secure universal hitch 10, in part, to the chassis of the vehicle, such as at a starboard chassis piece 54. It is contemplated that one or more attachment tensioners 50 can be attached to both the chassis of the vehicle and hitch sheath 11. It is also contemplated that attachment tensioner 50 can be connected to other secure locations underneath the vehicle besides the chassis beams.

Attachment tensioner 50, take-up mechanism 51, and hook 55, collectively, serve as an example and illustration of a tensioning means, attached to a hitch base at a first end thereof and extending fore of the vehicle to an opposite second end thereof, for releasably attaching at the second end thereof to the chassis beam. Take-up mechanism 51 serves as an example and an illustration of a means for adjusting the length between the first and second ends of the tensioning means.

As can be seen in FIG. 2, starboard bumper attachment extension 58 and port bumper attachment extension 60 have respectively, at an end thereof a starboard bumper pad 62 and a port bumper pad 64. Bumper pads 62, 64 are attached to a bumper 66. While the depiction in FIG. 2 of attachment extensions 58, 60, bumper pads 62, 64, and bumper 66 are illustrative of a general arrangement of conventional land vehicles, it is not intended to be a limitation to the understanding of the variety of land vehicle chassis arrangements to which the inventive universal hitch can be adapted. Nevertheless, universal hitch 10 is seen fitting underneath bumper 66 and providing a vertically directed force upon starboard chassis piece 54 at C-bracket 46, while attachment tensioner 50 is secured to starboard chassis piece 54 via hook 55 at an end of attachment tensioner 50. Compression arm 40 and extension 42 form a structure that is tightly held in place at C-bracket 46 by increasing the tension by take-up mechanism 51 of attachment tensioner 50 on starboard chassis piece 54.

The longitudinal extension and retraction of any of the telescoping pieces in the inventive universal trailer hitch, including the proposed attachment tensioner 50 shown in FIGS. 1 and 2, can be powered manually, hydraulically, or electrically as is known to the artisan. C-bracket 46 can be C-shaped, U-shaped, or can assume a variety of shapes as is desired. It is preferable that a C-shape be used as it serves to accommodate a great variety of subframes or chassis of different land vehicles.

It is contemplated, in one embodiment of the universal trailer hitch, that attachment tensioner 50 and extension 42 are of a uniform length and are not longitudinally adjustable. Even without such longitudinal adjustability, the inventive universal hitch can still accommodate a great variety of chassis of land vehicles.

It is intended that high quality structural materials be used to construct the inventive universal hitch. Attachment tensioner 50 can incorporate a steel cord, a solid metal rod, although other materials are also contemplated. Due to the exposure of the inventive universal hitch to inclement weather, a galvanized surface is desirable, as well as other weather-resistant coatings and treatments which are also contemplated for most parts of the inventive universal hitch.

The universal hitch attaches to the chassis of the vehicle in several places. The aforementioned jaws are attached to the bumper-mounting bracket on both the starboard and port sides. One or more attachment tensioners are attached to the chassis via hooks at one end of the cables and are attached to the hitch sleeve or other part of the hitch at the other end of the attachment tensioner. The compression arm, which extends towards the front of the vehicle, rests against the bottom side of the chassis. The attachment tensioner 50 serves to maintain C-bracket 46 tightly against chassis piece 54 via a vertically upward directed force, which force is adjustable by take-up mechanism 51, to assist in securing universal hitch 10 in relative non-movement with respect to the chassis. The combination of these attachments and supports of the universal hitch to the chassis of the vehicle provides stability to the non-permanent hitch installation.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A trailer hitch for attachment of a tongue of a trailer to a vehicle having a port bumper-mounting bracket, a starboard bumper-mounting bracket, and a chassis beam running essentially fore and aft along the underside of the vehicle, said hitch comprising:

(a) a port gripping means for releasably gripping said port bumper-mounting bracket;

(b) a starboard gripping means for releasably gripping said starboard bumper-mounting bracket;

(c) a port gripping and having a first end opposite a second end and being connected at the first end thereof to said port gripping means and extending vertically below the port bumper-mounting bracket to the second end thereof when said port gripping means grips said port bumper-mounting bracket;

(d) a starboard gripping arm having a first end opposite a second end and being connected at the first end thereof to said starboard gripping means and extending below the starboard bumper-mounting bracket to the second end thereof when said starboard gripping means grips said starboard bumper-mounting bracket;

(e) a hitch base having a port end opposite a starboard end, said port end of said hitch base having attached thereat the second end of said port gripping arm, said starboard end of said hitch base having attached thereat the second end of said starboard gripping arm;

(f) tongue bearing means, attached to said hitch base and extending aft therefrom, for attaching the tongue of the trailer;

(g) compression means, attached to said hitch base at a first end thereof and extending fore of the vehicle to an opposite second end thereof, for exerting at the second end thereof a vertically upward directed force upon said chassis beam; and (i) tensioning means, attached to said hitch base at a first end thereof and extending fore of the vehicle to an opposite second end thereof, for releasably attaching at the second end thereof to the chassis beam.

2. The hitch as defined in claim 1, wherein said port gripping means comprises means for adjustment of the strength of the grip thereof upon said port bumper-mounting bracket, and wherein said starboard gripping means comprises means for adjustment of the strength of the grip thereof upon said starboard bumper-mounting bracket.

3. The hitch as defined in claim 2, wherein:

(a) said port gripping means further comprises a channel adjustable into and out of said port gripping arm by said means for adjustment of the strength of the grip thereof, said channel having an upper jaw at an end thereof for placement upon a top side of said port bumper-mounting bracket, and further comprises a lower jaw attached at the first end of said port gripping arm for placement upon a bottom side of said port bumper-mounting bracket, whereby the upper and lower jaws of the port gripping means adjustably gripping the port bumper-mounting bracket by said means for adjustment of the strength of the grip thereof upon said port bumper-mounting bracket; and wherein (b) said starboard gripping means further comprises a channel adjustable into and out of said starboard gripping arm by said means for adjustment of the strength of the grip thereof, said channel having an upper jaw at an end thereof for placement upon a top side of said starboard bumper-mounting bracket, and further comprises a lower jaw attached at the first end of said starboard gripping arm for placement upon a bottom side of said starboard bumper-mounting bracket, whereby the upper and lower jaws of the starboard gripping means adjustably gripping the starboard bumper-mounting bracket by said means for adjustment of the strength of the grip thereof upon said starboard bumper-mounting bracket.

4. The hitch as defined in claim 1, wherein said hitch base further comprises means for adjusting the distance between the port and starboard ends thereof.

5. The hitch as defined in claim 4, wherein said means for adjusting the distance between the port and starboard ends of the hitch base comprises:

(a) an adjustably telescoping port side channel slidingly received into and out of a hitch sheath;

(b) an adjustably telescoping starboard side channel slidingly received into and out of said hitch sheath; and (c) means for preventing the movement of the port and starboard channels relative to the hitch sheath.

6. The hitch as defined in claim 1, wherein said tongue bearing means comprises an adjustably telescoping draw-bar channel having a fore-end opposite an aft-end, the fore-end of the draw-bar channel being slidingly received into and out of a draw-bar sheath attached to the hitch base, the aft-end of the draw-bar channel having a towing ball attached thereat for attaching the tongue of a trailer.

7. The hitch as defined in claim 1, wherein said compression means comprises:

(a) a first channel extending fore of vehicle from the first end of the compression means to a junction section; and (b) a second channel having a length extending essentially perpendicular to the first channel from the junction section to the second end of the compression means.

8. The hitch as defined in claim 7, wherein said junction section comprises means for adjusting the length of the second channel of the compression means.

9. The hitch as defined in claim 7, wherein the second end of the compression means has a C-bracket thereat for placement at least in part around and against said chassis beam.

10. The hitch as defined in claim 1, wherein said compression means comprises means for attaching the first end of the compression means to one of the port or starboard ends of the hitch base.

11. The hitch as defined in claim 1, wherein said compression means comprises hinge means, situated at the first end of the compression means, for pivoting the position of the second end of the compression means with respect to the port and starboard side of the vehicle.

12. The hitch as defined in claim 1, wherein said tensioning means comprises:

(a) an elongate member having a first end opposite a second end;

(b) means for attaching the first end of the elongate member to the hitch base;

(c) means for adjusting the length between the first and second ends of the tensioning means; and (d) means for attaching the second end of the elongate member to the chassis beam.

13. The hitch as defined in claim 12, wherein the elongate member is a solid rod.

14. The hitch as defined in claim 12, wherein the elongate member is a flexible cable.

15. A trailer hitch for attachment of a tongue of a trailer to a vehicle having a port bumper-mounting bracket, a starboard bumper-mounting bracket, and a chassis beam running essentially fore and aft along the underside of the vehicle, said hitch comprising:

(a) a port gripping means for releasably gripping said port bumper-mounting bracket;

(b) a starboard gripping means for releasably gripping said starboard bumper-mounting bracket;

(c) a port gripping arm having a first end opposite a second end and being connected at the first end thereof to said port gripping means and extending vertically below the port bumper-mounting bracket to the second end thereof when said port gripping means grips said port bumper-mounting bracket;

(d) a starboard gripping and having a first end opposite a second end and being connected at the first end thereof to said starboard gripping means and extending below the starboard bumper-mounting bracket to the second end thereof when said starboard gripping means grips said starboard bumper-mounting bracket;

(e) a hitch base having a port end opposite a starboard end, said port end of said hitch base having attached thereat the second end of said port gripping arm, said starboard end of said hitch base having attached thereat the second end of said starboard gripping arm said hitch base having means for adjusting the distance between the port and starboard ends thereof comprising:

(1) an adjustably telescoping port side channel slidingly received into and out of a hitch sheath;

(2) an adjustably telescoping starboard side channel slidingly received into and out of said hitch sheath; and (3) means for preventing the movement of the port and starboard channels relative to the hitch sheath:

(f) tongue bearing means, attached to said hitch base and extending aft therefrom for attaching the tongue of the trailer;

(g) compression means, attached to said hitch base at a first end thereof and extending fore of the vehicle to an opposite second end thereof, for exerting at the second end thereof a vertically upward directed force upon said chassis beam, said compression means having means for attaching the first end of the compression means to one of the port or starboard ends of the hitch base; and (h) tensioning means, attached to said hitch base at a first end thereof and extending fore of the vehicle to an opposite second end thereof, for releasably attaching at the second end thereof to the chassis beam, and comprising:
(1) an elongate member having a first end opposite a second end;
(2) means for attaching the first end of the elongate member to the hitch base;
(3) means for adjusting the length between the first and second ends of the tensioning means; and
(4) means for attaching the second end of the elongate member to the chassis beam.

16. The hitch as defined in claim 15, wherein said port gripping means comprises means for adjustment of the strength of the grip thereof upon said port bumper-mounting bracket, and wherein said starboard gripping means comprises means for adjustment of the strength of the grip thereof upon said starboard bumper-mounting bracket.

17. The hitch as defined in claim 16, wherein:
(a) said port gripping means further comprises a channel adjustable into and out of said port gripping arm by said means for adjustment of the strength of the grip thereof said channel having an upper jaw at an end thereof for placement upon a top side of said port bumper-mounting bracket, and further comprises a lower jaw attached at the first end of said port gripping arm for placement upon a bottom side of said port bumper-mounting bracket, whereby the upper and lower jaws of the port gripping means adjustably gripping the port bumper-mounting bracket by said means for adjustment of the strength of the grip thereof upon said port bumper-mounting bracket; and wherein
(b) said starboard gripping means timber comprises a channel adjustable into and out of said starboard gripping arm by said means for adjustment of the strength of the grip thereof said channel having an upper jaw at an end thereof for placement upon a top side of said starboard bumper-mounting bracket, and further comprises a lower jaw attached at the first end of said starboard gripping arm for placement upon a bottom side of said starboard bumper-mounting bracket, whereby the upper and lower jaws of the starboard gripping means adjustably gripping the starboard bumper-mounting bracket by said means for adjustment of the strength of the grip thereof upon said starboard bumper-mounting bracket.

18. The hitch as defined in claim 15, wherein said tongue bearing means comprises an adjustably telescoping draw-bar channel having a fore-end opposite an aft-end, the fore-end of the draw-bar channel being slidingly received into and out of a draw-bar sheath attached to the hitch base, the aft-end of the draw-bar channel having a towing ball attached thereat for attaching the tongue of a trailer.

19. The hitch as defined in claim 15, wherein said compression means comprises:
(a) a first channel extending fore of vehicle from the first end of the compression means to a junction section; and
(b) a second channel having a length extending essentially perpendicular to the first channel from the junction section to the second end of the compression means.

20. The hitch as defined in claim 19, wherein said junction section comprises means for adjusting the length of the second channel of the compression means.

21. The hitch as defined in claim 19, wherein the second end of the compression means has a C-bracket thereat for placement at least in part around and against said chassis beam.

22. The hitch as defined in claim 15, wherein said compression means comprises hinge means, situated at the first end of the compression means, for pivoting the position of the second end of the compression means with respect to the port and starboard side of the vehicle.

23. The hitch as defined in claim 15, wherein the elongate member is a solid rod.

24. The hitch as defined in claim 15, wherein the elongate member is a flexible cable.

25. A trailer hitch for attachment of a tongue of a trailer to a vehicle having a port bumper-mounting bracket, a starboard bumper-mounting bracket, and a chassis beam running essentially fore and aft along the underside of the vehicle, said hitch comprising:
(a) a port gripping means for releasably gripping said port bumper-mounting bracket, said port gripping means comprising:
(1) means for adjustment of the strength of the grip thereof upon said port bumper-mounting bracket; and
(2) a channel adjustable into and out of said port gripping arm by said means for adjustment of the strength of the grip thereof, said channel of said port gripping means having an upper jaw at an end thereof for placement upon a top side of said port bumper-mounting bracket, and further comprises a lower jaw attached at the first end of said port gripping arm for placement upon a bottom side of said port bumper-mounting bracket, whereby the upper and lower jaws of the port gripping means adjustably gripping the port bumper-mounting bracket by said means for adjustment of the strength of the grip thereof upon said port bumper-mounting bracket; and wherein
(b) a starboard gripping means for releasably gripping said starboard bumper-mounting bracket, said starboard gripping means comprising:
(1) means for adjustment of the strength of the grip thereof upon said starboard bumper-mounting bracket; and
(2) a channel adjustable into and out of said starboard gripping arm by said means for adjustment of the strength of the grip thereof, said channel of said starboard gripping means having an upper jaw at an end thereof for placement upon a top side of said starboard bumper-mounting bracket, and further comprises a lower jaw attached at the first end of said starboard gripping arm for placement upon a bottom side of said starboard bumper-mounting bracket, whereby the upper and lower jaws of the starboard gripping means adjustably gripping the starboard bumper-mounting bracket by said means for adjustment of the strength of the grip thereof upon said starboard bumper-mounting bracket;
(c) a port gripping arm having a first end opposite a second end and being connected at the first end thereof to said port gripping means and extending vertically below the port bumper-mounting bracket to the second end thereof when said port gripping means grips said port bumper-mounting bracket;
(d) a starboard gripping and having a first end opposite a second end and being connected at the first end thereof to said starboard gripping means and extending below the starboard bumper-mounting bracket to the second end thereof when said starboard gripping means grips said starboard bumper-mounting bracket;
(e) a hitch base having a port end opposite a starboard end, said port end of said hitch base having attached thereat the second end of said port gripping arm, said starboard end of said hitch base having attached thereat the second end of said starboard gripping arm said hitch base having means for adjusting the distance between the port and starboard ends thereof comprising:
  (1) an adjustably telescoping port side channel slidingly received into and out of a hitch sheath;
  (2) an adjustably telescoping starboard side channel slidingly received into and out of said hitch sheath; and
  (3) means for preventing the movement of the port and starboard channels relative to the hitch sheath;
(f) tongue bearing means, attached to said hitch base and extending aft therefrom, for attaching the tongue of the trailer;
(g) compression means, attached to said hitch base at a first end thereof and extending fore of the vehicle to an opposite second end thereof for exerting at the second end thereof a vertically upward directed force upon said chassis beam, said compression means having means for attaching the first end of the compression means to one of the port or starboard ends of the hitch base, said compression means comprising:
  (1) hinge means, situated at the first end of the compression means, for pivoting the position of the second end of the compression means with respect to the port and starboard side of the vehicle;
  (2) a first channel extending fore of vehicle from the first end of the compression means to a junction section;
  (3) a second channel having a length extending essentially perpendicular to the first channel from the junction section to the second end of the compression means; and
  (4) said junction section comprising means for adjusting the length of the second channel of the compression means;
(h) tensioning means, attached to said hitch base at a first end thereof and extending fore of the vehicle to an opposite second end thereof, for releasably attaching at the second end thereof to the chassis beam, and comprising:
  (1) an elongate flexible member having a first end opposite a second end;
  (2) means for attaching the first end of the elongate member to the hitch base;
  (3) means for adjusting the length between the first and second ends of the tensioning means; and
  (4) means for attaching the second end of the elongate flexible member to the chassis beam.

* * * * *